United States Patent
Dong

(10) Patent No.: US 12,082,037 B2
(45) Date of Patent: Sep. 3, 2024

(54) METHOD, APPARATUS, COMMUNICATION DEVICE AND STORAGE MEDIUM FOR CONFIGURING TRANSMISSION OF RECEIPT FEEDBACK INFORMATION

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 127 days.

(21) Appl. No.: 17/763,620

(22) PCT Filed: Sep. 25, 2019

(86) PCT No.: PCT/CN2019/107959
§ 371 (c)(1),
(2) Date: Mar. 24, 2022

(87) PCT Pub. No.: WO2021/056288
PCT Pub. Date: Apr. 1, 2021

(65) Prior Publication Data
US 2022/0338051 A1 Oct. 20, 2022

(51) Int. Cl.
*H04W 28/02* (2009.01)
*H04L 1/1607* (2023.01)

(52) U.S. Cl.
CPC ....... *H04W 28/0231* (2013.01); *H04L 1/1607* (2013.01)

(58) Field of Classification Search
None
See application file for complete search history.

(56) References Cited

U.S. PATENT DOCUMENTS

| | | | |
|---|---|---|---|
| 9,986,586 B2 | 5/2018 | Lee et al. | |
| 10,476,648 B2 | 11/2019 | Kim et al. | |
| 10,771,126 B2* | 9/2020 | Chu | H04W 72/21 |
| 11,924,814 B2* | 3/2024 | Nezou | H04W 72/0446 |
| 2005/0135295 A1* | 6/2005 | Walton | H04W 74/00 370/328 |

(Continued)

FOREIGN PATENT DOCUMENTS

| | | |
|---|---|---|
| CN | 106464354 A | 2/2017 |
| CN | 107104769 A | 8/2017 |

(Continued)

OTHER PUBLICATIONS

ISA State Intellectual Property Office of the People's Republic of China, International Search Report Issued in Application No. PCT/CN2019/107959, May 27, 2020, WIPO, 4 pages.

(Continued)

*Primary Examiner* — Mariela Vidal Carpio
(74) *Attorney, Agent, or Firm* — Volpe Koenig

(57) ABSTRACT

Methods, apparatuses, communication devices and storage media for configuring transmission of receipt feedback information. A Request To Send (RTS) frame is generated in a case that a data frame is transmitted in a plurality of transmission bands. The RTS frame includes feedback resource information for indicating a transmission resource through which receipt feedback information is transmitted by a data frame receiver. And, the RTS frame is sent.

13 Claims, 4 Drawing Sheets

(56) References Cited

U.S. PATENT DOCUMENTS

| | | | |
|---|---|---|---|
| 2011/0194542 A1* | 8/2011 | Kim | H04W 74/0816 |
| | | | 370/338 |
| 2014/0079016 A1* | 3/2014 | Dai | H04L 5/0041 |
| | | | 370/329 |
| 2016/0227578 A1 | 8/2016 | Lee et al. | |
| 2016/0302229 A1 | 10/2016 | Hedayat | |
| 2017/0019230 A1* | 1/2017 | Rajkotia | H04L 1/08 |
| 2017/0104570 A1 | 4/2017 | Kim et al. | |
| 2017/0273111 A1* | 9/2017 | Wong | H04W 74/0816 |
| 2018/0076860 A1* | 3/2018 | Chu | H04L 1/1854 |
| 2018/0115305 A1* | 4/2018 | Islam | H04B 7/0417 |
| 2018/0115994 A1* | 4/2018 | Islam | H04B 7/0695 |
| 2018/0167950 A1* | 6/2018 | Vanninen | H04W 72/541 |
| 2019/0280728 A1* | 9/2019 | Salem | H04L 5/1461 |
| 2020/0288326 A1* | 9/2020 | Borges | H04W 24/10 |
| 2021/0329698 A1* | 10/2021 | Jang | H04W 74/0816 |

FOREIGN PATENT DOCUMENTS

| | | |
|---|---|---|
| CN | 107113885 A | 8/2017 |
| CN | 107734669 A | 2/2018 |

OTHER PUBLICATIONS

Steve Shellhammer et al, "HARQ Complexity", IEEE 802.11-19/1080r0, Jul. 15, 2019, 18 pages.

\* cited by examiner

METHOD, APPARATUS, COMMUNICATION DEVICE AND STORAGE MEDIUM FOR CONFIGURING TRANSMISSION OF RECEIPT FEEDBACK INFORMATION

CROSS-REFERENCE TO RELATED APPLICATION

This application is the U.S. national phase application of International Application No. PCT/CN2019/107959, filed on Sep. 25, 2019, the disclosure of which is incorporated herein by reference in its entirety for all purposes.

TECHNICAL FIELD

The present disclosure relates to, but not limited to, the field of wireless communication technology, and in particular to methods, apparatuses, communication devices and storage media for configuring transmission of receipt feedback information.

BACKGROUND

The Institute of Electrical and Electronics Engineers establishes a study group (SG) to study next-generation mainstream Wi-Fi technologies. The study covers a Wi-Fi transmission technology with 320 MHz bandwidth, a multi-band aggregation and coordination technology, and the like, with proposing a vision of at least four-times increase in speed and throughput compared with the existing IEEE802.11ax. The main application scenarios of the new technologies include video transmission, augmented reality (AR), virtual reality (VR), etc. In particular, the multi-band aggregation and coordination technology refers to that a communication between Wi-Fi devices is performed in 2.4 GHz, 5.8 GHz and 6-7 GHz bands simultaneously.

SUMMARY

In view of the above, the embodiments of the present disclosure provide a method, apparatus, communication device and storage medium for configuring transmission of receipt feedback information.

According to a first aspect of the embodiments of the present disclosure, a method of configuring transmission of receipt feedback information is provided and includes generating a Request To Send (RTS) frame in a case that a data frame is transmitted in a plurality of transmission bands, wherein the RTS frame includes feedback resource information for indicating a transmission resource through which receipt feedback information is transmitted by a data frame receiver; and sending the RTS frame.

According to a second aspect of the embodiments of the present disclosure, a method of configuring transmission of receipt feedback information is provided and includes receiving a Request To Send (RTS) frame in a case that a data frame is transmitted in a plurality of transmission bands, wherein the RTS frame includes feedback resource information for indicating a transmission resource through which receipt feedback information is transmitted by a data frame receiver; and sending the receipt feedback information through the transmission resource.

According to a third aspect of the embodiments of the present disclosure, a communication device is provided and includes one or more processors, a memory, and an executable program stored on the memory and capable of being executed by the one or more processors, wherein when executing the executable program, the one or more processors perform the steps of the methods of configuring transmission of receipt feedback information described in the first aspect and the second aspect.

It should be understood that the above general description and the following detailed description are only illustrative and explanatory, and are not intended to limit the scope of the present disclosure.

BRIEF DESCRIPTION OF THE DRAWINGS

The accompanying drawings, which are incorporated in and constitute a part of this specification, illustrate examples consistent with the scope of the present disclosure and, together with the description, serve to explain the principles of the disclosure.

DETAILED DESCRIPTION OF THE EMBODIMENTS

Embodiments will be described in detail herein with examples thereof illustrated in the accompanying drawings. Where the following descriptions refer to the drawings, like numerals in different drawings refer to like or similar elements unless otherwise indicated. The implementations described in the following examples do not represent all possible implementations within the scope of the present disclosure. Rather, they are merely examples of apparatuses and methods consistent with the scope of the present disclosure as detailed in the appended claims The terms used in the present disclosure are for the purpose of describing particular examples only, and are not intended to limit the scope of the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish information of the same category with each other. For example, without departing from the scope of the present disclosure, first information may be referred as second information; and similarly, second information may also be referred as first information. Depending on the context, the word "if" as used herein may be interpreted as "when", "upon", or "in response to determining".

The operating bodies involved in the examples of the present disclosure include, but not limited to, network devices in a wireless communication network, especially a Wi-Fi network under, for example, IEEE802.11a/b/g/n/ac standard, and network devices in a next-generation Wi-Fi network under IEEE802.11be standard. The network device includes but not limited to: a wireless access point (AP) device such as a Wi-Fi router, and a wireless station (STA), a user equipment, a user node, a mobile terminal or tablet computer, etc.

The examples of the present disclosure may be applied in such one scenario where the shortest length for the device to receive acknowledgment (ACK) is one short inter-frame space (SIFS) according to IEEE 802.11 standard. The SIFS is 10 us in 2.4 GHz and 16 us in 5 GHz band. Due to its processing speed, a data frame receiver may not complete decoding a data frame within 10 us or 16 us, but will send receipt feedback information of the data frame to a data frame sender.

Figure 1:
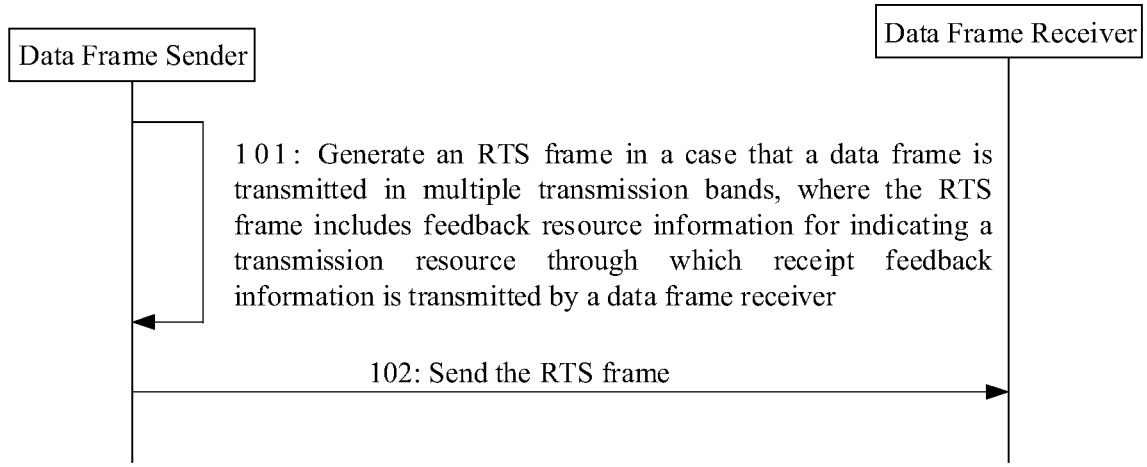
FIG. 1 is a schematic flowchart illustrating a method of configuring transmission of receipt feedback information according to an example.

As illustrated in FIG. 1, the examples provide a method of configuring transmission of receipt feedback information. The method of configuring transmission of receipt feedback information is applicable to a data frame sender in a wireless communication and includes the following steps.

At step 101, an RTS frame is generated in a case that a data frame is transmitted in multiple transmission bands, where the RTS frame includes feedback resource information for indicating a transmission resource through which receipt feedback information is transmitted by a data frame receiver. Then at step 102, the RTS frame is sent.

The wireless communication may be a Wi-Fi communication under the standard such as IEEE802.11be. The data frame sender and the data frame receiver may be wireless stations and the like in the Wi-Fi communication. The data frame may be transmitted in one or more transmission bands of the multiple transmission bands. The data frame may be a media access control protocol data unit (MPDU), an aggregated media access control protocol data unit (A-MPDU), or the like.

The multiple transmission bands may refer to multiple Wi-Fi working frequency bands, such as 2.4 GHz, 5.8 GHz and 6-7 GHz. Alternatively, the multiple transmission bands may refer to frequency ranges corresponding to bandwidths occupied respectively by the transmission bands. The frequency ranges corresponding to the bandwidths occupied by various transmission bands may belong to the same Wi-Fi working frequency band, or may belong to different Wi-Fi working frequency bands.

One or more data frames are sent by the data frame sender via multiple transmission bands, and are received by the data frame receiver. The data frame receiver may be a wireless station in the Wi-Fi communication, etc. The multiple transmission bands have different frequency coverage ranges, and may transmit the one or more data frames at the same time, thereby improving transmission rate and transmission efficiency of the data frames.

The receipt feedback information may be ACK information or non-acknowledgement (NACK) information for feeding back a status of receiving the data frame, Block ACK information for feeding back a status of receiving a continuous data frame, or the like.

Before a data transmission, the data frame sender and the data frame receiver first shake hands according to a transmission protocol. The handshake process may include that the RTS frame is sent by the data frame sender, which indicates the data frame sender is to send the data frame to the data frame receiver. After receiving the RTS frame, the data frame receiver sends a Clear to Send (CTS) frame to the data frame sender.

The feedback resource information may be carried in the RTS frame to indicate the transmission resource, through which the receipt feedback information is transmitted, to the data frame receiver. The transmission resource may be a time domain resource and/or a frequency domain resource for transmitting the receipt feedback information, and the transmission resource information may also be a time domain resource and/or a time-frequency resource in one of the frequency bands for sending the data frame. For example, the time domain resource indicated by the feedback resource information may be a time period after the data frame receiver receives the data frame and completes processing such as demodulating and decoding. In this way, such a situation that the data frame receiver does not complete decoding the data frame when sending the receipt feedback information can be mitigated.

After receiving the feedback resource information carried in the RTS frame, the data frame receiver receives the data frame and performs processing on the data frame, such as demodulating and decoding. The data frame receiver determines the status of receiving the data frame, and sends the receipt feedback information to the data frame sender through the transmission resource indicated by the feedback resource information.

In this way, the transmission resource for transmitting the receipt feedback information is indicated by adopting the feedback resource information. Therefore, on the one hand, the sender can adapt the transmission resource in accordance with an actual situation via sending the RTS frame, which improves a flexibility of configuring the transmission resource for the receipt feedback information. On the other hand, the receipt feedback information is no longer sent in a fixed time and/or in a fixed band, which mitigates such a situation that the data frame has not been completely decoded when the receipt feedback information is sent, thereby improving an accuracy of the receipt feedback information.

In one example, the feedback resource information includes at least one of: feedback band information for indicating a feedback transmission band in which the receipt feedback information is transmitted by the data frame receiver; or feedback time interval information for indicating a feedback time interval at which the receipt feedback information is transmitted by the data frame receiver.

The feedback transmission band may be one of the multiple transmission bands. The feedback transmission band may be configured to transmit the receipt feedback information after completing the transmission of the data frame.

The feedback time interval may be a time period after the data frame receiver completes decoding the data frame. In this way, the receipt feedback information may be sent after the status of receiving the data frame has been determined, which reduces the occurrence of wrong receipt feedback information.

In one example, the feedback time interval at which the receipt feedback information is transmitted includes one point coordination function (PCF) inter-frame space (PIFS) to 100 milliseconds after the data frame is sent.

The data frame may include a unicast data frame or a continuous data frame. In the case of the continuous data frame, one PIFS to 100 milliseconds after the data frame is sent refers to one PIFS to 100 milliseconds after the last data subframe of the continuous data frame is sent.

The SIFS is used to separate various frames during one data transmission, for example, to separate between a data frame and an ACK frame. In related art, since there is only one SIFC as an interval between the data frame and the receipt feedback information, the data frame receiver does not have enough time to complete parsing the data frame, so that the data frame receiver cannot send such receipt feedback information that can reflect the actual status of receiving the data frame. Relative to the SIFS, there also is the PIFS during the Wi-Fi communication. The PIFS is usually used for a wireless AP with a PCF. The AP with the PCF usually accesses a channel at one PIFS interval. The length of the PIFS is a sum of the length of the SIFS and one slot time. Through sending the receipt feedback information with an interval of one PIFS behind the data frame, it can provide more sufficient time for the data frame receiver to perform decoding and other processing. Thus, the data frame receiver can send such receipt feedback information that reflects the actual status of receiving the data frame. Therefore, through sending the receipt feedback information within the time period from one SIFS to 100 milliseconds after the data frame is sent, it can reduce the probability that the received feedback information is wrong because the data frame has not been completely decoded. The 100 ms, as the maximum time limit, can provide an upper limit of the feedback time and improve the efficiency of feeding back the receipt feedback information.

In one example, the method further includes: receiving the receipt feedback information sent by the data frame receiver based on the feedback resource information.

Receiving the receipt feedback information sent by the data frame receiver based on the feedback resource information includes receiving, through the transmission resource indicated by the feedback resource information, the receipt feedback information sent by the data frame receiver.

After receiving the feedback resource information carried in the RTS frame, the data frame receiver receives the data frame and performs processing on the data frame, such as demodulating and decoding. The data frame receiver determines the status of receiving the data frame, and sends the receipt feedback information to the data frame sender through the transmission resource indicated by the feedback resource information.

In one example, before sending the RTS frame, the method further includes determining, based on a load condition of each of the transmission bands, the feedback transmission band in which the receipt feedback information is transmitted.

In the case where one or more data frames are transmitted via the multiple transmission bands, the loads of the various transmission bands may be different. For example, the one with a smaller load may be adopted to transmit the receipt feedback information.

Based on sending time and receiving time of one or more data frames transmitted in each transmission band, the transmission of the one or more data frames may be classified into synchronous transmission and asynchronous transmission. For example, FIGS. 2A-2D illustrate Physical Layer Protocol Data Units (PPDUs) carrying one or more data frames and corresponding respectively to multiple transmission bands. As previously described, the data frame may be an MPDU, an A-MPDU, or the like.

Figure 2A:
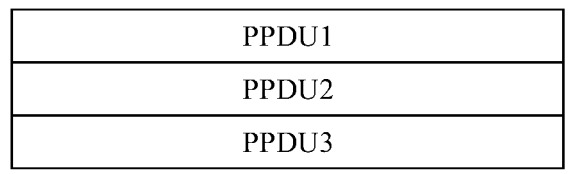
FIGS. 2A-2D are schematic diagrams illustrating ways of transmitting a data frame according to an example.

The synchronous transmission is illustrated in FIG. 2A, in which PPDU1, PPDU2, and PPDU3 carrying one or more data frames have identical sending time and arrive at the receiver at the same moment in the various transmission bands. The asynchronous transmission is illustrated in FIG. 2B to FIG. 2D, including three cases.

Figure 2B:
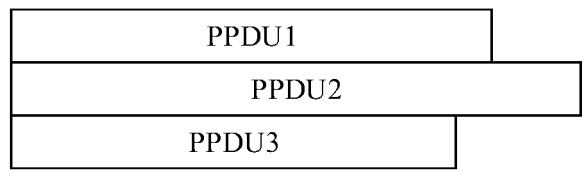

In the first case, as illustrated in FIG. 2B, PPDU1, PPDU2, and PPDU3 carrying one or more data frames have identical sending time but arrive at the receiver at different moments in the various transmission bands.

Figure 2C:
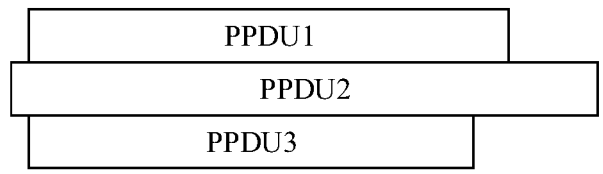

In the second case, as illustrated in FIG. 2C, PPDU1, PPDU2, and PPDU3 carrying one or more data frames have different sending time and arrive at the receiver at different moments in the various transmission bands.

Figure 2D:
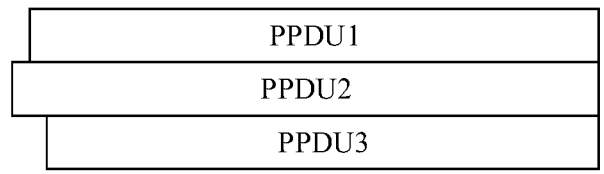

In the third case, as illustrated in FIG. 2D, PPDU1, PPDU2, and PPDU3 carrying one or more data frames have different sending time but arrive at the receiver at the same moment in the various transmission bands. The moment at which the data frame arrives at the receiver may be determined by the sender based on the sending time of the data frame, the length of the data frame, etc.

In one example, determining, based on the load condition of each of the transmission bands, the feedback transmission band in which the receipt feedback information is transmitted includes at least one of determining the transmission band which has a minimum load value as the feedback transmission band; or determining the transmission band which links a minimum number of wireless stations as the feedback transmission band.

Each transmission band has a load value. The load condition of the transmission band may be determined by reading the load value. Since the transmission of the receipt feedback information has to occupy a certain resource, transmitting the receipt feedback information in the transmission band with a minimum load can fully utilize the transmission band with low load. In comparison to adopting the transmission band with high load to send data, the transmission can be performed in time without queuing due to the load, while the quality of the transmission can be ensured due to a low code rate which is allowed by the transmission frequency under the lower load.

The more the number of wireless stations that relevantly links the transmission band, the greater the probability of higher load occurred in the transmission band. Additionally, the fewer the number of wireless stations that establish associations with the transmission band, the lower the probability of higher load occurred in the transmission band. Therefore, the receipt feedback information may be received in the transmission band which establishes associations with a minimum number of wireless stations, thereby increasing the probability of transmitting the receipt feedback information in the transmission band with low load, and improving the utilization efficiency of the transmission band.

In one example, the method further includes: transmitting the data frame via the multiple transmission bands. A duration indicated by a Duration field included in the data frame includes a transmission length of the data frame, but not includes a transmission length of the receipt feedback information.

The data frame sender may adopt the multiple transmission bands to send the data frame. The data frame receiver may receive the data frame in the multiple transmission bands. Since the receipt feedback information is transmitted through the feedback resource designated by the RTS frame, the Duration field of the data frame may not include the transmission length of the receipt feedback information.

In one example, when the data frame is the unicast data frame, the transmission length of the data frame includes the transmission length of the single unicast data frame.

When the data frame is the continuous data frame, the transmission length of the data frame includes a sum of the transmission length of n data subframes included in the continuous data frame and n−1 SIFSs. The n indicates a positive integer equal to or greater than 2, and the SIFS is located between two adjacent ones of the data subframes.

The data frame may include the unicast data frame or the continuous data frame. The transmission of the unicast data frame refers to a transmission form in which the data is encapsulated in one data frame. For one unicast data frame, there is one piece of receipt feedback information. The transmission of the continuous data frame refers to a transmission form in which the data is encapsulated in multiple data subframes and is transmitted in sequence. For the continuous data frame, a way of block receipt feedback information (for example, Block ACK) may be adopted to feed back the receipt. The block receipt feedback information may include multiple pieces of feedback information, each of which is used to indicate the status of receiving one data subframe.

In the case of the unicast data frame, the transmission length of the data frame indicated by the Duration field may be the transmission length of the unicast data frame. In the case of the continuous data frame, the transmission length of the data frame indicated by the Duration field may be a sum of the transmission length of various data subframes included in the continuous data frame and the SIFSs between the various data subframes.

In the case of the continuous data frame, the status of receiving the continuous data frame may be fed back via the block receipt feedback information.

Figure 3:
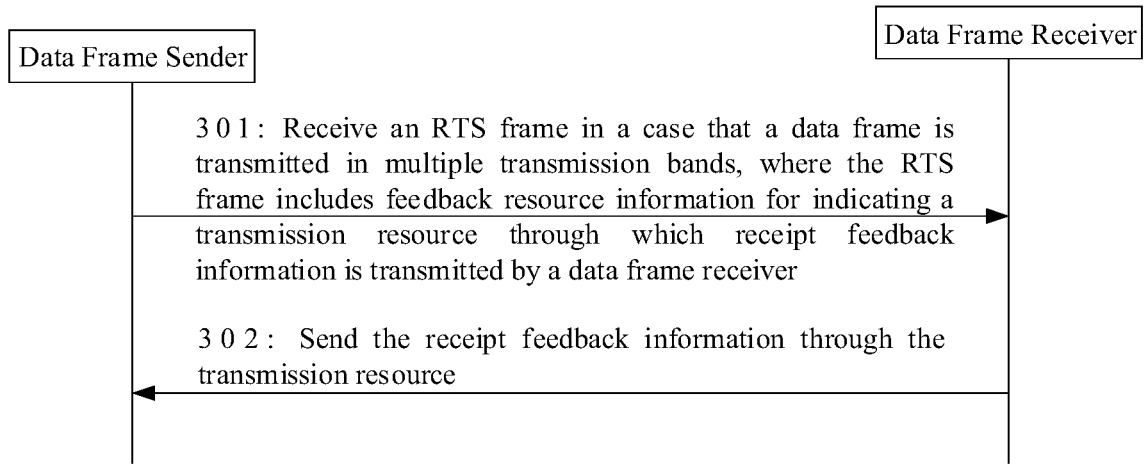
FIG. 3 is a schematic flowchart illustrating a method of configuring transmission of receipt feedback information according to an example.

As illustrated in FIG. 3, the examples of the present disclosure provide a method of configuring transmission of receipt feedback information, which is applicable to a data frame receiver in a wireless communication and includes the following steps.

At step 301, an RTS frame is received in a case that a data frame is transmitted in multiple transmission bands, where the RTS frame includes feedback resource information for indicating a transmission resource through which receipt feedback information is transmitted by a data frame receiver. Then, at step 302, the receipt feedback information is sent through the transmission resource.

The wireless communication may be a Wi-Fi communication under the standard such as IEEE802.11be. A data frame sender and the data frame receiver may be STAs and the like in the Wi-Fi communication. The data frame may be transmitted in one or more transmission bands of the multiple transmission bands. The data frame may be an MPDU, an A-MPDU, or the like.

The multiple transmission bands may refer to multiple Wi-Fi working frequency bands, such as 2.4 GHz, 5.8 GHz and 6-7 GHz. Alternatively, the multiple transmission bands may refer to frequency ranges corresponding to the bandwidths occupied respectively by the transmission bands. The frequency ranges corresponding to the bandwidths occupied by various transmission bands may belong to the same Wi-Fi working frequency band, or may belong to different Wi-Fi working frequency bands.

One or more data frames are sent by the data frame sender via multiple transmission bands, and are received by the data frame receiver. The data frame receiver may be a wireless station in the Wi-Fi communication, etc. The multiple transmission bands have different frequency coverage ranges, and may transmit the one or more data frames at the same time, thereby improving transmission rate and transmission efficiency of the data frames.

The receipt feedback information may be ACK or NACK for feeding back a status of receiving the data frame, Block ACK information for feeding back a status of receiving a continuous data frame, or the like.

Before a data transmission, the data frame sender and the data frame receiver first shake hands according to a transmission protocol. The handshake process may include that the RTS frame is sent by the data frame sender, which indicates the data frame sender is to send the data frame to the data frame receiver. After receiving the RTS frame, the data frame receiver sends a Clear to Send (CTS) frame to the data frame sender.

The feedback resource information may be carried in the RTS frame to indicate the transmission resource, through which the receipt feedback information is transmitted, to the data frame receiver. The transmission resource may be a time-domain resource and/or a frequency-domain resource for transmitting the receipt feedback information. For example, the time domain resource indicated by the feedback resource information may be a time period after the data frame receiver receives the data frame and completes processing such as demodulating and decoding. In this way, such a situation that the data frame receiver does not complete decoding the data frame when sending the receipt feedback information can be mitigated.

After receiving the feedback resource information carried in the RTS frame, the data frame receiver receives the data frame and performs processing on the data frame, such as demodulating and decoding. The data frame receiver determines the status of receiving the data frame, and sends the receipt feedback information to the data frame sender through the transmission resource indicated by the feedback resource information.

In this way, the transmission resource for transmitting the receipt feedback information is indicated by adopting the feedback resource information. Therefore, on the one hand, the sender can adapt the transmission resource in accordance with an actual situation via sending the RTS frame, which improves a flexibility of configuring the transmission resource for the receipt feedback information. On the other hand, the receipt feedback information is no longer sent in a fixed time and/or in a fixed band, which mitigates such a situation that the data frame has not been completely decoded when the receipt feedback information is sent, thereby improving an accuracy of the receipt feedback information.

In one example, the feedback resource information includes at least one of: feedback band information for indicating a feedback transmission band in which the receipt feedback information is transmitted by the data frame receiver; or feedback time interval information for indicating a feedback time interval at which the receipt feedback information is transmitted by the data frame receiver.

The feedback transmission band may be one of the multiple transmission bands. The feedback transmission band may be configured to transmit the receipt feedback information after completing the transmission of the data frame.

The feedback time interval may be a time period after the data frame receiver completes decoding the data frame. In this way, the receipt feedback information may be sent after the status of receiving the data frame has been determined, which reduces the occurrence of wrong receipt feedback information.

In one example, the feedback time interval at which the receipt feedback information is transmitted includes one PIFS to 100 milliseconds after the data frame is sent.

The data frame may include a unicast data frame or a continuous data frame. In the case of the continuous data frame, one PIFS to 100 milliseconds after the data frame is sent refers to one PIFS to 100 milliseconds after the last data subframe of the continuous data frame is sent.

The SIFS is used to separate various frames during one data transmission, for example, to separate between a data frame and an ACK frame. In related art, since there is only one SIFC as an interval between the data frame and the receipt feedback information, the data frame receiver does not have enough time to complete parsing the data frame, so that the data frame receiver cannot send such receipt feedback information that can reflect the actual status of receiving the data frame. Relative to the SIFS, there also is the PIFS during the Wi-Fi communication. The PIFS is usually used for a wireless AP with a PCF. The AP with the PCF usually accesses a channel at one PIFS interval. The length of the PIFS is a sum of the length of the SIFS and one slot time. Through sending the receipt feedback information with an interval of one PIFS behind the data frame, it can provide more sufficient time for the data frame receiver to perform decoding and other processing. Thus, the data frame receiver can send such receipt feedback information that reflects the actual status of receiving the data frame. Therefore, through sending the receipt feedback information within the time period from one SIFS to 100 milliseconds after the data frame is sent, it can reduce the probability that the received feedback information is wrong because the data frame has not been completely decoded. The 100 ms, as the maximum time limit, can provide an upper limit of the feedback time and improve the efficiency of feeding back the receipt feedback information.

In one example, the method further includes: transmitting the data frame via the multiple transmission bands. A duration indicated by a Duration field included in the data frame includes a transmission length of the data frame, but not includes a transmission length of the receipt feedback information.

The data frame sender may adopt the multiple transmission bands to send the data frame. The data frame receiver may receive the data frame in the multiple transmission bands. Since the receipt feedback information is transmitted through the feedback resource designated by the RTS frame, the Duration field of the data frame may not include the transmission length of the receipt feedback information.

In one example, when the data frame is a unicast data frame, the transmission length of the data frame includes the transmission length of the single unicast data frame.

When the data frame is a continuous data frame, the transmission length of the data frame includes a sum of the transmission length of n data subframes included in the continuous data frame and n−1 SIFSs. The n indicates a positive integer equal to or greater than 2, and the SIFS is located between two adjacent ones of the data subframes.

The data frame may include the unicast data frame or the continuous data frame. The transmission of the unicast data frame refers to a transmission form in which the data is encapsulated in one data frame. For one unicast data frame, there is one piece of receipt feedback information. The transmission of the continuous data frame refers to a transmission form in which the data is encapsulated in multiple data subframes and is transmitted in sequence. For the continuous data frame, a way of block receipt feedback information (for example, Block ACK) may be adopted to feed back the receipt. The block receipt feedback information may include multiple pieces of feedback information, each of which is used to indicate the status of receiving one data subframe.

In the case of the unicast data frame, the transmission length of the data frame indicated by the Duration field may be the transmission length of the unicast data frame. In the case of the continuous data frame, the transmission length of the data frame indicated by the Duration field may be a sum of the transmission length of various data subframes included in the continuous data frame and the SIFSs between the various data subframes.

In the case of the continuous data frame, the status of receiving the continuous data frame may be fed back via the block receipt feedback information.

One specific example is provided below in conjunction with any of the foregoing examples.

1. Set the Duration Field of a Data Frame

Based on sending time and receiving time of one or more data frames transmitted in each transmission link, the transmission of the one or more data frames may be classified into synchronous transmission and asynchronous transmission.

For example, the synchronous transmission is illustrated in FIG. 2A, in which PPDU1, PPDU2, and PPDU3 carrying one or more data frames have identical sending time and arrive at the receiver at the same moment in the various transmission links.

The asynchronous transmission is illustrated in FIG. 2B to FIG. 2D, including three cases.

In the first case, as illustrated in FIG. 2B, PPDU1, PPDU2, and PPDU3 carrying one or more data frames have identical sending time but arrive at the receiver at different moments in the various transmission links.

In the second case, as illustrated in FIG. 2C, PPDU1, PPDU2, and PPDU3 carrying one or more data frames have different sending time and arrive at the receiver at different moments in the various transmission links.

In the third case, as illustrated in FIG. 2D, PPDU1, PPDU2, and PPDU3 carrying one or more data frames have different sending time but arrive at the receiver at the same moment in the various transmission links.

Regardless of whether it is synchronous or asynchronous, the Duration field of the data frame only includes its own transmission length, but not includes the length of the received ACK frame. Therefore, in the first case of the unicast data frame, the duration length is set to the length of the data frame. In the second case of the continuous data frame, the duration length is set to n*data subframe length+ (n−1)*SIFS. The n is the amount of the data subframes in the continuous data frame.

2. Determine Frequency Band and Receipt Interval for an ACK Frame

Figure 4:
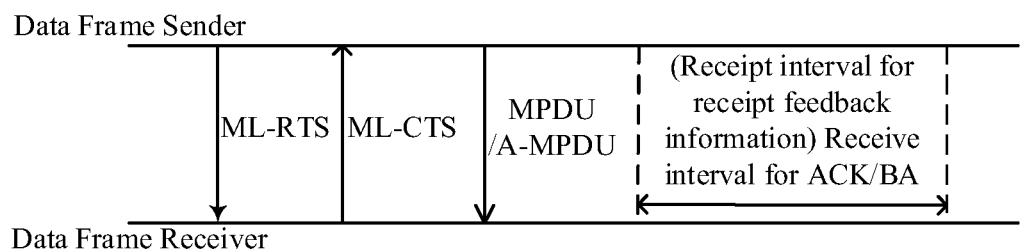
FIG. 4 is a schematic diagram illustrating a data interaction between a data frame sender and a data frame receiver according to an example.

As illustrated in the schematic diagram of an interaction between the data frame sender and the data frame receiver in FIG. 4, the data frame sender sends a multi-link (ML) RTS frame to the data frame receiver. The ML-RTS carries the frequency band and a monitoring interval corresponding to the receipt feedback information/block receipt feedback information (ACK/BA). The specific monitoring interval is 1 ms-100 ms after an MPDU/A-MPDU is sent. The data frame receiver returns a CTS to approve receiving the data frame. The data frame sender sends the data frame to the data frame receiver. The data frame receiver sends the receipt feedback information to the data frame sender in the frequency band and at the monitoring interval both of which are indicated by the ML-RTS.

The data frame sender can determine the frequency band for receiving the ACK frame based on a degree of communication congestion in the frequency bands which is received.

Figure 5:
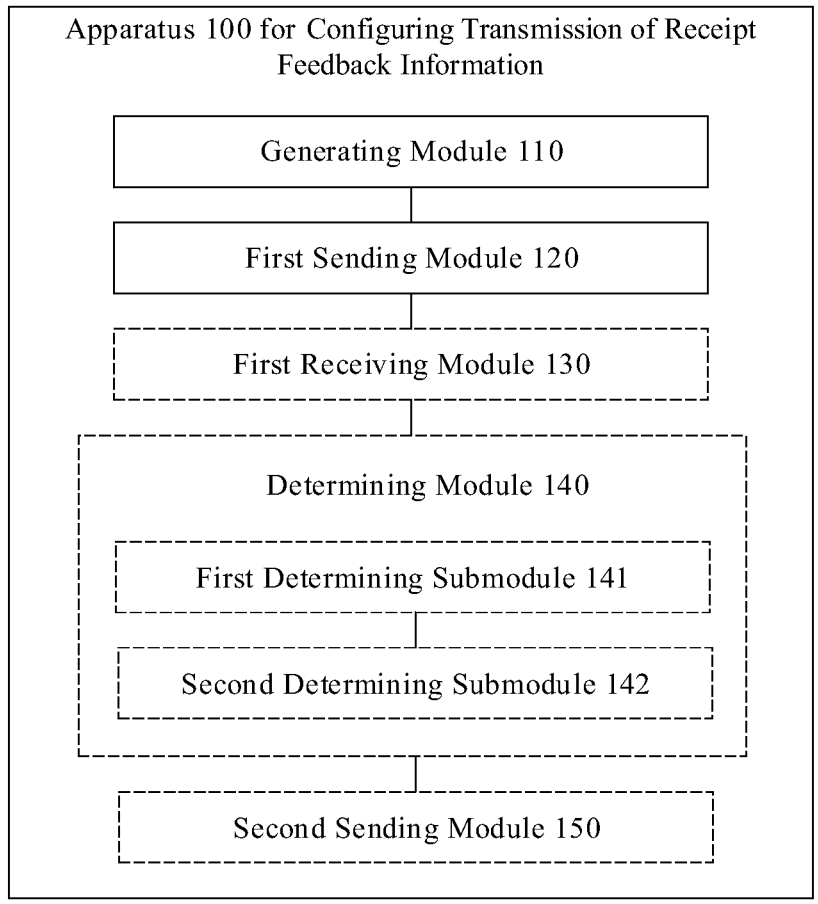
FIG. 5 is a block diagram illustrating an apparatus for configuring transmission of receipt feedback information according to one example.

The examples of the present disclosure also provide an apparatus for configuring transmission of receipt feedback information, which is applicable to a data frame sender in a wireless communication. As illustrated in FIG. 5, the apparatus 100 for configuring transmission of receipt feedback information includes a generating module 110 and a first sending module 120.

The generating module 110 is configured to generate an RTS frame in a case that a data frame is transmitted in multiple transmission bands. The RTS frame includes feedback resource information for indicating a transmission resource through which receipt feedback information is transmitted by a data frame receiver. The first sending module 120 is configured to send the RTS frame.

In one example, the feedback resource information includes at least one of feedback band information for indicating a feedback transmission band in which the receipt feedback information is transmitted by the data frame receiver; or feedback time interval information for indicating a feedback time interval at which the receipt feedback information is transmitted by the data frame receiver.

In one example, the feedback time interval at which the receipt feedback information is transmitted includes one PIFS to 100 milliseconds after the data frame is sent.

In one example, the apparatus 100 further includes a first receiving module 130, configured to receive, through the transmission resource indicated by the feedback resource information, the receipt feedback information sent by the data frame receiver.

In one example, the apparatus 100 further includes a determining module 140, configured to determine before sending the RTS frame, based on a load condition of each of the transmission bands, a feedback transmission band in which the receipt feedback information is transmitted.

In one example, the determining module 140 includes at least one of a first determining submodule 141, configured to determine the transmission band which has a minimum load value as the feedback transmission band; or a second determining submodule 142, configured to determine the transmission band which relevantly links a minimum number of wireless stations as the feedback transmission band.

In one example, the apparatus 100 further includes a second sending module 150, configured to transmit the data frame via the multiple transmission bands.

A duration indicated by a Duration field included in the data frame includes a transmission length of the data frame, but not includes a transmission length of the receipt feedback information.

In one example, when the data frame is a unicast data frame, the transmission length of the data frame includes the transmission length of the single unicast data frame.

When the data frame is a continuous data frame, the transmission length of the data frame includes a sum of the transmission length of n data subframes included in the continuous data frame and n−1 SIFS. The n indicates a positive integer equal to or greater than 2, and the SIFS is located between two adjacent ones of the data subframes.

Figure 6:
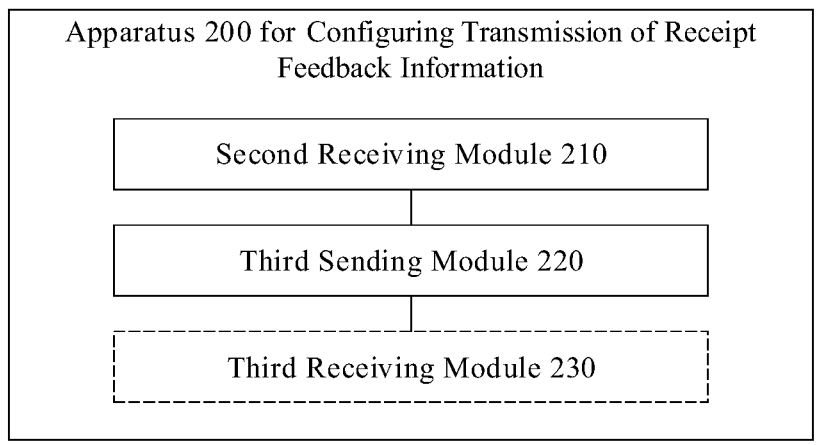
FIG. 6 is a block diagram illustrating another apparatus for configuring transmission of receipt feedback information according to one example.

The examples of the present disclosure also provide an apparatus for configuring transmission of receipt feedback information, which is applicable to a data frame receiver in a wireless communication. As illustrated in FIG. 6, the apparatus 200 includes a second receiving module 210 and a third sending module 220.

The second receiving module 210 is configured to receive an RTS frame in a case that a data frame is transmitted in multiple transmission bands. The RTS frame includes feedback resource information for indicating a transmission resource through which receipt feedback information is transmitted by a data frame receiver.

The third sending module 220 is configured to send the receipt feedback information through the transmission resource.

In one example, the feedback resource information includes at least one of feedback band information for indicating a feedback transmission band in which the receipt feedback information is transmitted by the data frame receiver; or feedback time interval information for indicating a feedback time interval at which the receipt feedback information is transmitted by the data frame receiver.

In one example, the feedback time interval at which the receipt feedback information is transmitted includes one PIFS to 100 milliseconds after the data frame is sent.

In one example, the apparatus 200 further includes a third receiving module 230, configured to receive the data frame transmitted via the multiple transmission bands.

A duration indicated by a Duration field included in the data frame includes a transmission length of the data frame, but not includes a transmission length of the receipt feedback information.

In one example, when the data frame is a unicast data frame, the transmission length of the data frame includes the transmission length of the single unicast data frame.

When the data frame is a continuous data frame, the transmission length of the data frame includes a sum of the transmission length of n data subframes included in the continuous data frame and n−1 SIFS. The n indicates a positive integer equal to or greater than 2, and the SIFS is located between two adjacent ones of the data subframes.

In the examples, the generating module 110, the first sending module 120, the first receiving module 130, the determining module 140, the second sending module 150, the second receiving module 210, the third sending module 220, the third receiving module 230 and the like may be implemented by one or more central processing units (CPU), one or more graphics processing units (GPU), one or more baseband processors (BP), one or more application specific integrated circuits (ASIC), one or more DSPs, one or more programmable logic devices (PLD), one or more complex programmable logic devices (CPLD), one or more field-programmable gate arrays (FPGA), one or more general-purpose processors, one or more controller units, one or more micro controller units (MCU), one or more microprocessors, or other electronic components for performing the foregoing methods.

Figure 7:
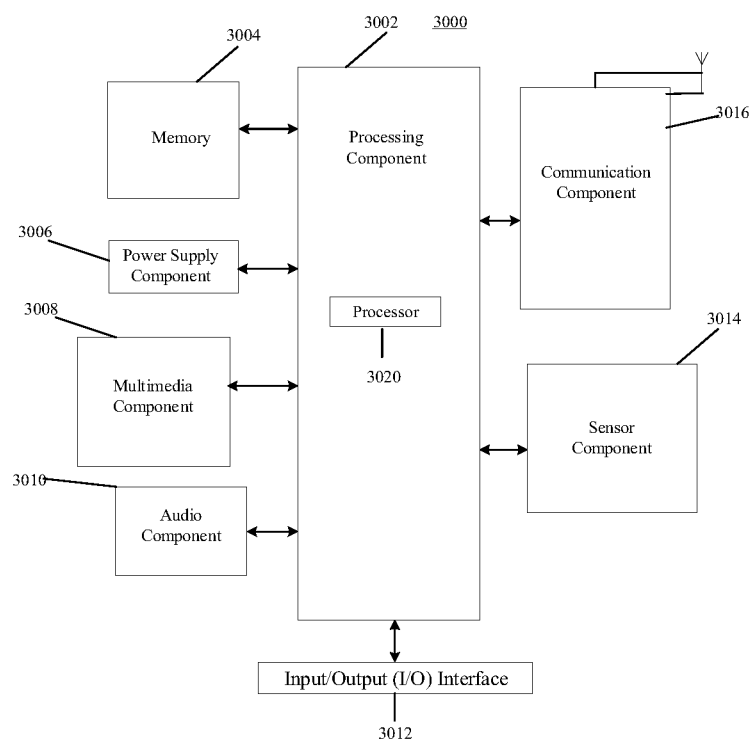
FIG. 7 is a block diagram illustrating a device for configuring transmission of receipt feedback information according to one example.

FIG. 7 is a block diagram illustrating a device 3000 for configuring transmission of receipt feedback information according to one example. For example, the device 3000 may be a mobile phone, a computer, a digital broadcasting terminal, a messaging device, a game console, a tablet device, a medical device, a fitness device, a personal digital assistant, and the like.

Referring to FIG. 7, the device 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the overall operations of the device 3000, such as operations associated with display, phone calls, data communications, camera operations, and recording operations. The processing component 3002 may include one or more processors 3020 to execute instructions to complete all or part of the steps of the above methods. In addition, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operations of the device 3000. Examples of such data include instructions for any application program or method operated on the device 3000, contact data, phonebook data, messages, pictures, videos, and the like. The memory 3004 may be implemented by any type of volatile or non-volatile storage device or a combination thereof, such as a static random-access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 provides power to various components of the device 3000. The power supply component 3006 may include a power management system, one or more power supplies, and other components associated with generating, managing, and distributing power for the device 3000.

The multimedia component 3008 includes a screen providing an output interface between the device 3000 and a user. In some examples, the screen may include a liquid crystal display (LCD) or a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 3008 includes a front camera and/or a rear camera. The front camera and/or rear camera may receive external multimedia data when the device 3000 is in an operating mode, such as a photographing mode or a video mode. Each front camera and rear camera may be a fixed optical lens system or have focal length and optical zooming capability.

The audio component 3010 is configured to output and/or input an audio signal. For example, the audio component 3010 includes a microphone (MIC) that is configured to receive an external audio signal when the device 3000 is in an operating mode, such as a call mode, a recording mode, and a voice recognition mode. The received audio signal may be further stored in memory 3004 or transmitted via communication component 3016. In some examples, the audio component 3010 also includes a speaker for outputting an audio signal.

The I/O interface 3012 provides an interface between the processing component 3002 and a peripheral interface module. The above peripheral interface module may be a keyboard, a click wheel, buttons, or the like. These buttons may include but not limited to, a home button, a volume button, a start button and a lock button.

The sensor component 3014 includes one or more sensors to provide the device 3000 with status assessments in various aspects. For example, the sensor component 3014 may detect an open/closed state of the device 3000 and a relative positioning of components such as the display and keypad of the device 3000, and the sensor component 3014 may also detect a change in position of the device 3000 or a component of the device 3000, the presence or absence of user contact with the device 3000, orientation or acceleration/deceleration of the device 3000, and temperature change of the device 3000. The sensor component 3014 may include a proximity sensor configured to detect the presence of a nearby object without any physical contact. The sensor component 3014 may also include a light sensor, such as a complementary metal oxide semiconductor (CMOS) or a charge-coupled device (CCD) image sensor for use in imaging applications. In some examples, the sensor component 3014 may also include an acceleration sensor, a gyro sensor, a magnetic sensor, a pressure sensor, or a temperature sensor.

The communication component 3016 is configured to facilitate wired or wireless communication between the device 3000 and other devices. The device 3000 may access a wireless network based on a communication standard, such as Wi-Fi, 2G, 3G, or a combination thereof. In an example, the communication component 3016 receives broadcast signals or broadcast related information from an external broadcast management system via a broadcast channel. In an example, the communication component 3016 also includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth® (BT) technology and other technologies.

In one or more examples, the device 3000 may be implemented by one or more application specific integrated circuits (ASIC), digital signal processors (DSP), digital signal processing devices (DSPD), programmable logic devices (PLD), field programmable gate arrays (FPGA), controller units, micro controller units, microprocessors, or other electronic components for performing the above methods.

In one or more examples, there is also provided a non-transitory computer storage medium including executable instructions, such as the memory 3004 including executable instructions. The executable instructions can be executed by the one or more processors 3020 of the device 3000 to implement the above methods. For example, the non-transitory computer readable storage medium may be an ROM, a random access memory (RAM), a CD-ROM, a magnetic tape, a floppy disk, an optical data storage device, and the like.

According to the methods, apparatuses, communication devices and storage media for configuring transmission of receipt feedback information provided by the present disclosure, an RTS frame is generated in a case that a data frame is transmitted in a plurality of transmission bands, wherein the RTS frame includes feedback resource information for indicating a transmission resource through which receipt feedback information is transmitted by a data frame receiver. The RTS frame is sent. In this way, on the one hand, a sender can adapt the transmission resource in accordance with an actual situation via sending the RTS frame, which improves a flexibility of configuring the transmission resource for the receipt feedback information. On the other hand, the receipt feedback information is no longer sent in a fixed time and/or in a fixed band, which mitigates such a situation that the data frame has not been completely decoded when the receipt feedback information is sent, thereby improving an accuracy of the receipt feedback information.

Other implementations of the present disclosure will be readily apparent to those skilled in the art after referring to the specification and implementing the disclosure. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the true scope and spirit of the present disclosure are set forth in the appended claims.

It should be understood that the present disclosure is not limited to the above described definite structures illustrated in the drawings, and various modifications and changes could be made to the present disclosure without departing from the scope thereof. The scope of the present disclosure is to be limited only by the appended claims.

The invention claimed is:

1. A method of configuring transmission of receipt feedback information, performed by a data frame sender, comprising:
generating a Request To Send (RTS) frame in a case that a data frame is transmitted in a plurality of transmission bands, wherein the RTS frame comprises feedback resource information for indicating a data frame receiver a feedback transmission band and a feedback time interval through which receipt feedback information is transmitted;
sending the RTS frame; and
transmitting the data frame via the plurality of transmission bands,
wherein a duration indicated by a Duration field comprised in the data frame comprises a transmission length of the data frame with excluding a transmission length of the receipt feedback information,
wherein in response to determining that the data frame is a unicast data frame, the transmission length of the data frame comprises the transmission length of a single unicast data frame, and
wherein in response to determining that the data frame is a continuous data frame, the transmission length of the data frame comprises a sum of the transmission length of n data subframes comprised in the continuous data frame and n−1 short inter-frame spaces (SIFS), wherein the n indicates a positive integer equal to or greater than 2, and the SIFS is located between two adjacent ones of the data subframes.

2. The method according to claim 1, wherein the feedback resource information comprises:
feedback band information for indicating the data frame receiver the feedback transmission band in which the receipt feedback information is transmitted; and
feedback time interval information for indicating the data frame receiver the feedback time interval at which the receipt feedback information is transmitted.

3. The method according to claim 2, wherein the feedback time interval at which the receipt feedback information is transmitted comprises one point coordination function (PCF) inter-frame space (PIFS) to 100 milliseconds after the data frame is sent.

4. The method according to claim 1, further comprising:
receiving, through the feedback transmission band and the feedback time interval indicated by the feedback resource information, the receipt feedback information from the data frame receiver.

5. The method according to claim 1, further comprising:
determining before sending the RTS frame, based on a load condition of each of the transmission bands, the feedback transmission band in which the receipt feedback information is transmitted.

6. The method according to claim 5, wherein determining, based on the load condition of each of the transmission bands, the feedback transmission band in which the receipt feedback information is transmitted comprises at least one of:
determining the transmission band which has a minimum load value as the feedback transmission band; or
determining the transmission band which links a minimum number of wireless stations as the feedback transmission band.

7. A non-transitory storage medium on which an executable program is stored, wherein when the executable program is executed by one or more processor, the steps of the method of configuring transmission of receipt feedback information according to claim 1 are implemented.

8. A method of configuring transmission of receipt feedback information, performed by a data frame receiver, comprising:
receiving a Request To Send (RTS) frame in a case that a data frame is transmitted in a plurality of transmission bands, wherein the RTS frame comprises feedback resource information for indicating the data frame receiver a feedback transmission band and a feedback time interval through which receipt feedback information is transmitted;
sending the receipt feedback information through the feedback transmission band and the feedback time interval; and
receiving the data frame transmitted via the plurality of transmission bands,
wherein a duration indicated by a Duration field comprised in the data frame comprises a transmission length of the data frame with excluding a transmission length of the receipt feedback information,
wherein in response to determining that the data frame is a unicast data frame, the transmission length of the data frame comprises the transmission length of a single unicast data frame, and
wherein in response to determining that the data frame is a continuous data frame, the transmission length of the data frame comprises a sum of the transmission length of n data subframes comprised in the continuous data frame and n−1 short inter-frame spaces (SIFS), wherein the n indicates a positive integer equal to or greater than 2, and the SIFS is located between two adjacent ones of the data subframes.

9. The method according to claim 8, wherein the feedback resource information comprises:
feedback band information for indicating the data frame receiver the feedback transmission band in which the receipt feedback information is transmitted; or
feedback time interval information for indicating the data frame receiver the feedback time interval at which the receipt feedback information is transmitted.

10. The method according to claim 9, wherein the feedback time interval at which the receipt feedback information is transmitted comprises one point coordination function (PCF) inter-frame space (PIFS) to 100 milliseconds after the data frame is sent.

11. A data frame receiver, comprising one or more processors, a memory, and an executable program stored on the memory and capable of being executed by the one or more processors, wherein when executing the executable program, the one or more processors perform the steps of the method of configuring transmission of receipt feedback information according to claim 8.

12. A non-transitory storage medium on which an executable program is stored, wherein when the executable program is executed by one or more processor, the steps of the method of configuring transmission of receipt feedback information according to claim 8 are implemented.

13. A data frame sender, comprising one or more processors, a memory, and an executable program stored on the memory and capable of being executed by the one or more processors, wherein when executing the executable program, the one or more processors are configured to:

generate a Request To Send (RTS) frame in a case that a data frame is transmitted in a plurality of transmission bands, wherein the RTS frame comprises feedback resource information for indicating a data frame receiver a feedback transmission band and a feedback time interval through which receipt feedback information is transmitted;

send the RTS frame; and transmit the data frame via the plurality of transmission bands, wherein a duration indicated by a Duration field comprised in the data frame comprises a transmission length of the data frame with excluding a transmission length of the receipt feedback information, wherein in response to determining that the data frame is a unicast data frame, the transmission length of the data frame comprises the transmission length of a single unicast data frame, and wherein in response to determining that the data frame is a continuous data frame, the transmission length of the data frame comprises a sum of the transmission length of n data subframes comprised in the continuous data frame and n−1 short inter-frame spaces (SIFS), wherein the n indicates a positive integer equal to or greater than 2, and the SIFS is located between two adjacent ones of the data subframes.

\* \* \* \* \*